United States Patent [19]

Kivistik

[11] 3,825,773

[45] July 23, 1974

[54] INTERLOCKED PUSH-PULL DRIVER CIRCUIT

[75] Inventor: Olev Kivistik, Waynesboro, Va.

[73] Assignee: General Electric Company, West Lynn, Mass.

[22] Filed: May 4, 1973

[21] Appl. No.: 357,458

[52] U.S. Cl. .................... 307/255, 307/237, 330/15

[51] Int. Cl. .......................................... H03k 17/00

[58] Field of Search .............. 307/255, 237; 330/15

[56] References Cited

UNITED STATES PATENTS

| | | | |
|---|---|---|---|
| 3,448,395 | 6/1969 | Webb | 330/15 |
| 3,538,353 | 11/1970 | Hanger | 307/255 |

*Primary Examiner*—Rudolph V. Rolinec
*Assistant Examiner*—B. P. Davis

[57] ABSTRACT

An improved driver circuit having push-pull output transistors for supplying current to a load, includes an interlock circuit for preventing the simultaneous conduction of the two output transistors. The base-emitter junction of each output transistor is connected to the collector-emitter circuit of an interlock transistor. The base current for each interlock transistor comes from the current conducted to or from the load. As long as the interlock transistor is conductive, the input signal is unable to provide sufficient base current to turn on its associated output transistor. When the conductive output transistor becomes non-conductive, thereby removing the base current drive to the conductive interlock transistor, the conductive interlock transistor becomes non-conductive and allows the input voltage to supply base current to turn on the non-conductive output transistor.

6 Claims, 1 Drawing Figure

PATENTED JUL 23 1974 3,825,773
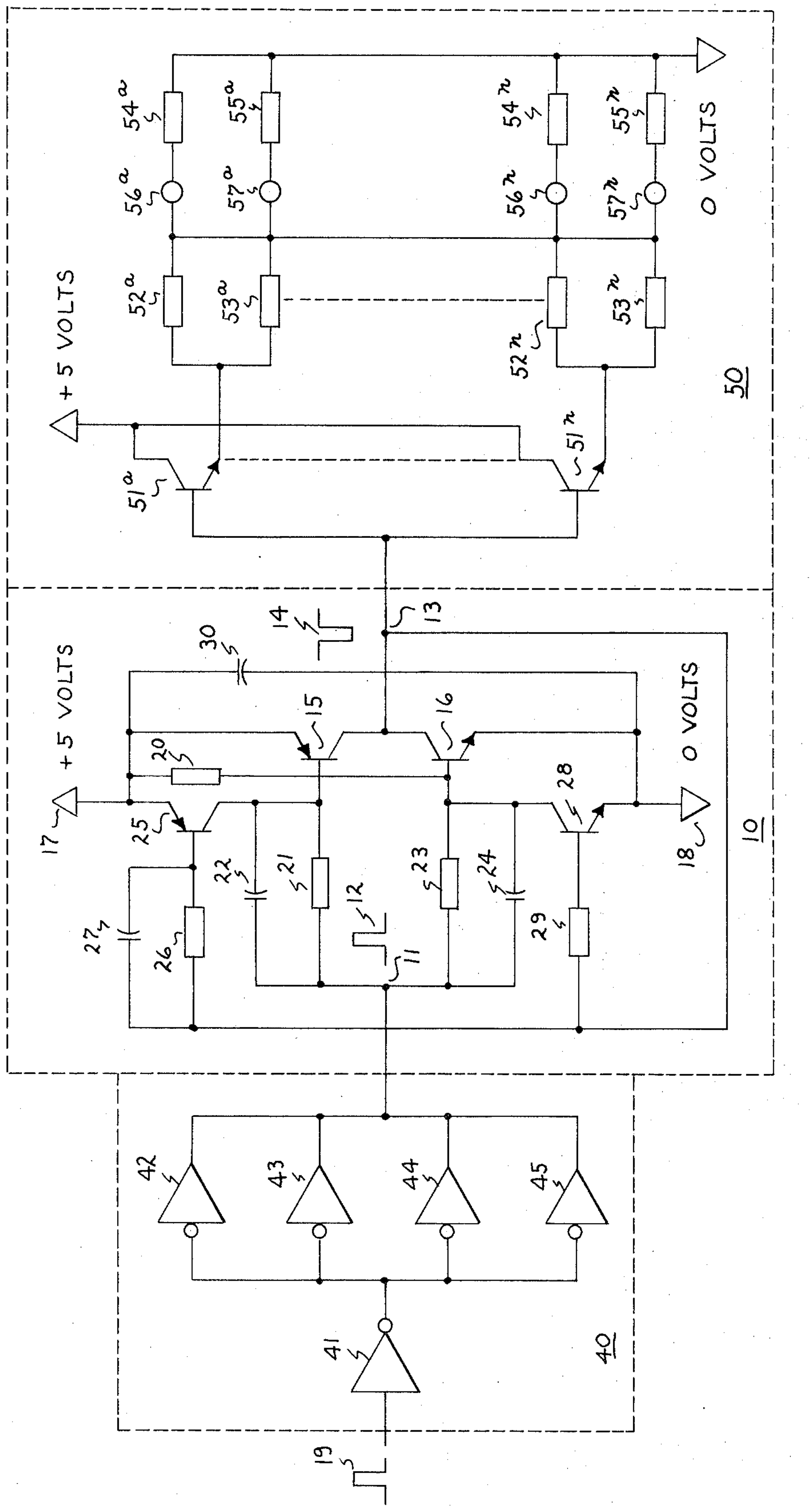

INTERLOCKED PUSH-PULL DRIVER CIRCUIT

BACKGROUND OF THE INVENTION

This invention relates to a switching circuit for driving a load from a push-pull output and, more particularly, to an interlock circuit for preventing the simultaneous conduction of the two output transistors that comprise the push-pull output. When it is desired to maintain both a fast rise time and a fast fall time of the signal to a load, it is driven from a switching circuit having a push-pull output. The load is connected to the positive terminal of a power source through a first switching transistor and to the negative terminal of the power source through a second switching transistor. When it is desired to supply current to the load from the positive terminal of the voltage source, the first transistor is made conductive and the second transistor is made non-conductive. Since the first transistor provides a low impedance circuit path between the positive terminal of the voltage source and the load, any stray capacitance at the load is quickly charged up thereby preserving a fast rise time of the output voltage. Similarly, when it is desired to conduct current from the load to the negative terminal of the voltage source, the second transistor is made conductive and the first transistor is made non-conductive. Since the second transistor provides a low impedance circuit path between the negative terminal of the voltage source and the load, the stray capacitance at the load is quickly discharged thereby preserving a fast fall time of the output voltage. The signal controlling the two transistors is generally applied simultaneously to each base electrode. Because the turn-off time delay of a transistor is greater than the turn-on time delay, there is a short interval of time during which both transistors are simultaneously in the conductive state. This results in an unusually low impedance across the voltage source and a corresponding increase in current flow through the two output transistors which can cause excessive heat generation in the two transistors resulting in their ultimate destruction. If a number of these switching circuits are employed, the excessive current that flows on the positive and negative power buses can cause excessive noise spikes throughout the system.

One possible solution is to provide a fixed time delay circuit that would delay the turning on of one transistor until the other transistor was made non-conductive. Such a scheme, however, has serious practical limitations in that the delay time would have to be adjusted for the particular circuit parameters at a given temperature. The delay time would also have to be fixed so as to be as long as the delay time of the slowest-acting transistor in the circuit.

A preferred solution to this problem would incorporate actual sensing of the conduction of the devices in each stage of the circuit, or more specifically, a feedback of actual operating conditions rather than just an allowance for worst case conditions. This would allow the switching circuit to operate at a maximum switching rate.

One prior art circuit that utilizes actual sensing of the conduction of the switching transistors is described in U.S. Pat. No. 3,538,353 — Hanger, assigned to the assignee of this invention. Hanger uses a first control transistor connected to the emitter-base circuit of one output switching transistor to determine the conductive state of the one output switching transistor. A second control transistor will allow the other output switching transistor to become conductive if the first control transistor indicates that the one output switching transistor is non-conductive and that the input signal to the entire circuit indicates that the other output transistor is to be conductive. Similar circuitry including two additional control transistors exists for preventing the one output switching transistor from being conductive until the other output switching transistor has become non-conductive. Thus, Hanger uses two control transistors for each output switching transistor to prevent the simultaneous conduction of the two output switching transistors. Also, Hanger does not sense the conductive condition of the output transistors at the load but rather senses the condition at the emitter-base junction of each output transistor.

It is, accordingly, an object of this invention to provide an improved switching circuit having a push-pull output.

It is another object of this invention to provide an improved interlock circuit for preventing the simultaneous conduction of the two output transistors of a push-pull switching circuit.

And yet another object of this invention is to provide a push-pull switching circuit that uses one transistor for each output switching transistor to prevent the simultaneous conduction of the two output transistors.

A further object of this invention is to provide a push-pull switching circuit wherein the interlock circuitry for each output switching transistor includes a single transistor which senses the conductive condition of its associated output switching transistor at the load and prevents the simultaneous conduction of the two output switching transistors.

SUMMARY OF THE INVENTION

In accordance with the invention a driver circuit having push-pull output transistors for supplying current to a load from first and second voltage sources is provided with interlock circuitry for preventing the simultaneous conduction of both output transistors. The base-emitter junction of each output transistor is connected to the collector-emitter circuit of an interlock transistor. The base current for each interlock transistor comes from the current conducted to or from the load. As long as the interlock transistor is conductive the input signal is unable to provide sufficient base current to turn on the output transistor associated with the conductive interlock transistor. When the conductive output transistor becomes non-conductive thereby removing the base current drive for the conductive interlock transistor, the conductive interlock transistor becomes non-conductive and allows the input voltage to supply base current to turn on the non-conductive output transistor. Thus, the non-conductive output transistor is prevented from becoming conductive until the conductive output transistor has become non-conductive.

DESCRIPTION OF THE DRAWING

While the specification concludes with claims particularly pointing out and distinctly claiming that which is regarded as the present invention, the objects and advantages of this invention can be more readily ascertained from the following description of a preferred embodiment when read in conjunction with the accompanying drawing. The drawing is a schematic diagram of the circuit of this invention including input and output circuitry illustrating an application of the invention.

DETAILED DESCRIPTION

As illustrated in the FIGURE, a preferred embodiment of the switching circuit 10 of this invention is being driven by logic circuits 40 and drives a load 50.

If the signal to the switching circuit 10 at the junction 11 is a pulse 12 that goes from a nominal zero volts to some positive voltage, the output of the switching circuit at junction 13 will be a pulse 14 that goes from a nominal +5 volts to a nominal zero volts.

The output driver portion of switching circuit 10 consists of output transistors 15 and 16, base current limiting resistors 21 and 23 and speed up capacitors 22 and 24. The two output transistors 15 and 16 are connected to provide a push-pull output. The emitter of p-n-p transistor 15 is connected to a first voltage source 17, which in this embodiment is +5 volts, and the emitter of n-p-n transistor 16 is connected to a second voltage source 18, which in this embodiment is zero volts. The collector of transistor 15 is connected to the collector of transistor 16 to provide the push-pull output to junction 13 and load 50. The signal at junction 11 is applied to the base of transistor 15 through base current limiting resistor 21 and speed up capacitor 22 and is applied to the base of transistor 16 through base current limiting resistor 23 and speed up capacitor 24.

The interlock portion of switching circuit 10 consists of interlock transistors 25 and 28, base current limiting resistors 26 and 29 and speed up capacitor 27. The emitter of p-n-p transistor 25 is connected to the first voltage source 17, and the collector of transistor 25 is connected to the base of transistor 15. The emitter of n-p-n transistor 28 is connected to the second voltage source 18, and the collector of transistor 28 is connected to the base of transistor 16. The output signal at junction 13 is applied to the base of transistor 25 through base current limiting resistor 26 and speed up capacitor 27, and is applied to the base of transistor 28 through base current limiting resistor 29.

Decoupling capacitor 30 helps to suppress any noise that may exist on the conductors used to apply the voltage sources 17 and 18 to the switching circuit 10. Resistor 20 connected between the voltage source 17 and the collector of interlock transistor 28 provides an additional source of collector current for interlock transistor 28 when it is made conductive.

The operation of the driver portion of the switching circuit 10 in the absence of the interlock circuitry will now be discussed. When zero volts is applied to the input junction 11, the emitter-base junction of output transistor 15 will be forward biased thereby causing output transistor 15 to be conductive and the emitter-base junction of output transistor 16 will be back biased causing output transistor 16 to be non-conductive. When output transistor 15 is conductive, the load 50 will be connected to the +5 volt source 17. When the input signal changes from 0 volts to some positive voltage, the rising edge of the voltage signal is coupled across speed up capacitors 22 and 24 to assist in back-biasing the emitter-base junction of output transistor 15 and forward-biasing the emitter-base junction of output transistor 16. With the positive voltage at the input junction 11, output transistor 15 will become non-conductive and output transistor 16 will become conductive. When output transistor 16 is conductive, the load 50 will be connected to the zero volt source 18. When the input signal changes from the positive voltage level to zero volts, the falling edge of the voltage signal is coupled across the speed up capacitors 22 and 24 to assist in forward biasing the emitter-base junction of output transistor 15 and back-biasing the emitter-base junction of output transistor 16. When the input signal is at zero volts the output transistor 15 will be maintained in the conductive state and the output transistor 16 will be maintained in the non-conductive state. Since the input signal is applied simultaneously to the bases of output transistors 15 and 16 and because the turn off time of a transistor is greater than the turn on time of a transistor, there can be a short period of time during which output transistors 15 and 16 are both conductive.

The interlock portion of the switching circuit 10 prevents the simultaneous conduction of output transistors 15 and 16. In operation, the interlock portion of switching circuit senses the current flowing to or from the load 50 and prevents the non-conductive output transistor from becoming conductive until the conductive output transistor has become non-conductive. As mentioned before when zero volts is applied to the input junction 11 of the switching circuit 10, output transistor 15 will be conductive, output transistor 16 will be non-conductive and +5 volts will be applied to the load 50. Current flowing from the +5 volts will be applied to the load 50. Current flowing from the +5 volts source is applied to the base of interlock transistor 25 through base current limiting resistor 26 and speed up capacitor 27, which back biases the emitter-base junction of interlock transistor 25 making it non-conductive. When interlock transistor 25 is non-conductive it has no effect on the base of output transistor 15 which is free to remain in the conductive state. When +5 volts is applied to the base circuit of interlock transistor 28, the emitter-base junction of interlock transistor 28 is forward biased which makes interlock transistor 28 conductive thereby connecting the zero volt source 18 to the base of output transistor 16. Thus, both the fact that zero volts is being applied to the base circuit of output transistor 16 from the input signal at junction 11 and the fact that the base of output transistor 16 is connected to the zero volt source 18 through interlock transistor 28 are preventing output transistor 16 from becoming conductive.

When the input signal to the switching circuit 10 changes from zero volts to the positive voltage level the rising edge of the input signal is coupled to the bases of output transistors 15 and 16. Since interlock transistor 25 has no effect on the base of output transistor 15, output transistor 15 will immediately respond to the input signal and begin switching to the non-conductive state. However, since interlock transistor 28 is in the conductive state and presents a very low impedance to the zero volt source 18, any current tending to flow in the base circuit of output transistor 16 as a result of the rising edge of the input voltage is shunted to the zero volt source through interlock transistor 28. The emitter-base junction of output transistor 16 remains back biased and output transistor 16 is maintained in the non-conductive state. As output transistor 15 becomes non-conductive the +5 volt source is no longer able to supply current to the base circuit of interlock transistor 28 and it responds by becoming non-conductive thereby allowing the base of output transistor 16 to be responsive to the +5 volts being applied to the input of the switching circuit 10. Thus, it can be seen that interlock transistor 28 has prevented output transistor 16 from becoming conductive until it has sensed that output transistor 15 has become non-conductive.

Since the switching circuit 10 is basically symmetrical it will be apparent to one skilled in the art that when the input signal goes from the positive voltage level to zero volts interlock transistor 25 will prevent output transistor 15 from becoming conductive until output transistor 16 has become non-conductive.

The FIGURE illustrates one application of the switching circuit of this invention to distribute clock pulses throughout a piece of digital equipment. The input logic circuits 41 through 45 merely function to provide a proper polarity of the input signal 19 and to provide sufficient current drive for the input of junction 11 of switching circuit 10. In this clock pulse distribution application the load is a plurality of emitter follower circuits each comprising a drive transistor, 51*a*, 51*n*, resistors 52*a*, 53*a*, 52*n*, 53*n* which make sure that transistors 51*a*, 51*n* share the load current and terminated loads as represented by resistors 54*a*, 55*a*, 54*n*, 55*n*. Digital circuits utilizing the clock pulses can be connected to the terminals 56*a*, 57*a*, 56*n*, 57*n*. While a specific load has been described in this described embodiment, it will be apparent to one skilled in the art that this driver circuit can be used to drive a variety of other loads.

Component values which operate with one embodiment of the switching circuit herein described are as follows:

| | |
|---|---|
| 15 transistor | 2N2894A |
| 16 transistor | 2N3646 |
| 20 resistor | 2700 ohms |
| 21 resistor | 820 ohms |
| 22 capacitor | 130 picofarads |
| 23 resistor | 330 ohms |
| 24 capacitor | 100 picofarads |
| 25 transistor | 2N2894A |
| 26 resistor | 5600 ohms |
| 27 capacitor | 47 picofarads |
| 28 transistor | 2N3646 |
| 29 resistor | 5600 ohms |
| 30 capacitor | 0.022 microfarads |

While the present invention has been described with reference to a specific embodiment thereof, it will be obvious to those skilled in the art that various changes and modifications may be made without departing from the invention in its broader aspects.

It is contemplated in the appended claims to cover all variations and modifications of the invention which come within the true spirit and scope of the invention.

What is claimed as new and desired to be secured by Letters Patent of the United States is:

1. A circuit for connecting a load to first and second sources in response to an input signal comprising:
   a. a first output transistor having an emitter connected to the first source, a collector connected to the load and a base responsive to the input signal,
   b. a second output transistor having an emitter connected to the second source, a collector connected to the load and a base responsive to the input signal,
   c. a first interlock transistor having an emitter connected to the emitter of the second output transistor, a collector connected to the base of the second output transistor and a base connected to the load so that part of the current conducted through the collector of the first output transistor flows through the base of said first interlock transistor so that the first interlock transistor becomes conductive and prevents the second output transistor from becoming conductive; and
   d. a second interlock transistor having an emitter connected to the emitter of the first output transistor, a collector connected to the base of the first output transistor and a base connected to the load so that part of the current conducted through the collector of the second output transistor flows through the base of said second interlock transistor so that the second interlock transistor becomes conductive and prevents the first output transistor from becoming conductive.

2. A circuit for selectively connecting a load to a first source in response to a first level of an input signal and to a second source in response to a second level of the input signal comprising:
   a. a first output transistor having an emitter connected to the first source, a collector connected to the load and a base responsive to the first level of the input signal,
   b. a second output transistor having an emitter connected to the second source, a collector connected to the load and a base responsive to the second level of the input signal,
   c. a first interlock transistor having an emitter connected to the emitter of the second output transistor, a collector connected to the base of the second output transistor and a base connected to the load so that part of the current conducted through the collector of the first output transistor flows through the base of said interlock transistor so that the first interlock transistor becomes conductive and prevents the second output transistor from responding to the second level of the input voltage until the first output transistor is non-conductive; and
   d. a second interlock transistor having an emitter connected to the emitter of the first output transistor, a collector connected to the base of the first output transistor and a base connected to the load so that part of the current conducted through the collector of the second output transistor flows through the base of said second interlock transistor so that the second interlock transistor becomes conductive and prevents the first output transistor from responding to the first level of the input voltage until the second output transistor is non-conductive.

3. A driver circuit as recited in claim 2 wherein the first output transistor and the second interlock transistor are of the p-n-p type and the second output transistor and the first interlock transistor are of the n-p-n type.

4. A driver circuit as recited in claim 1 wherein the first output transistor and the second interlock transistor are of the p-n-p type and the second output transistor and the first interlock transistor are of the n-p-n type.

5. A driver circuit as recited in claim 1 wherein the emitter and the collector of the first interlock transistor are directly connected to the emitter and base, respectively, of the second output transistor and wherein the emitter and the collector of the second interlock transistor are directly connected to the emitter and base, respectively, of the first output transistor.

6. A driver circuit as recited in claim 2 wherein the emitter and the collector of the first interlock transistor are directly connected to the emitter and base, respectively, of the second output transistor and wherein the emitter and the collector of the second interlock transistor are directly connected to the emitter and base, respectively, of the first output transistor.

* * * * *